(No Model.)
P. M. HOBBS.
COW MILKER.
No. 370,539. Patented Sept. 27, 1887.
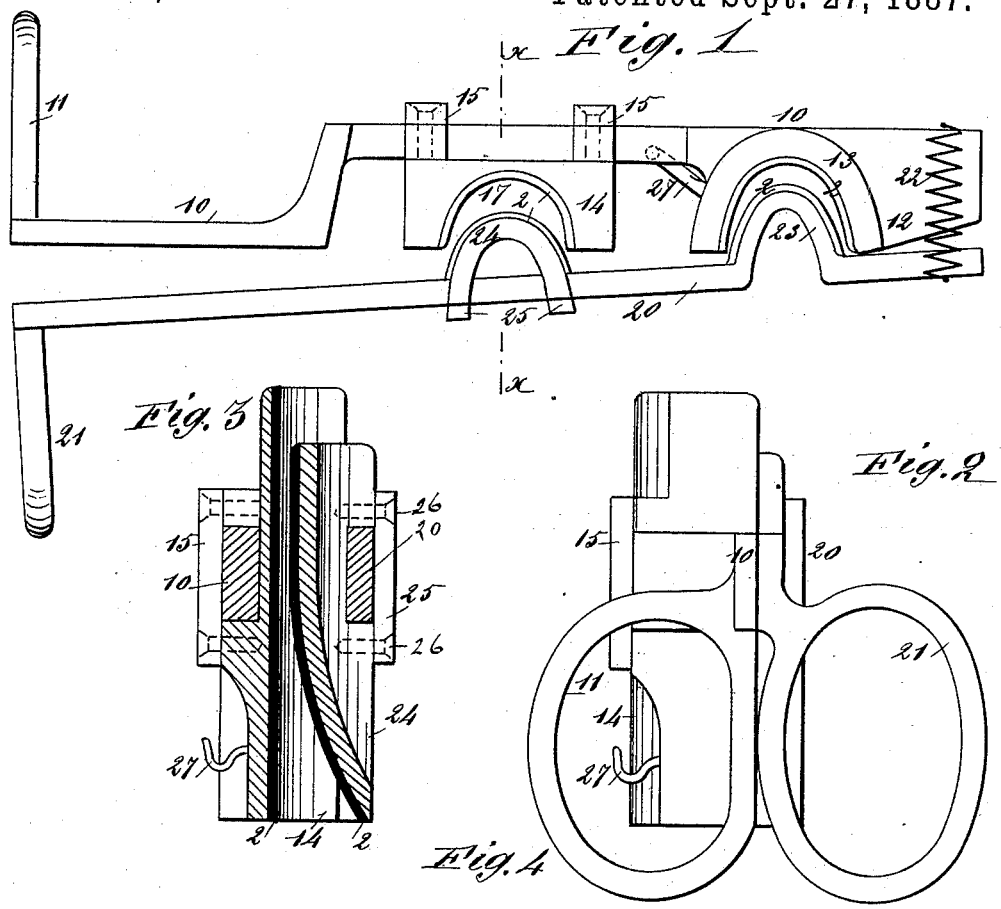
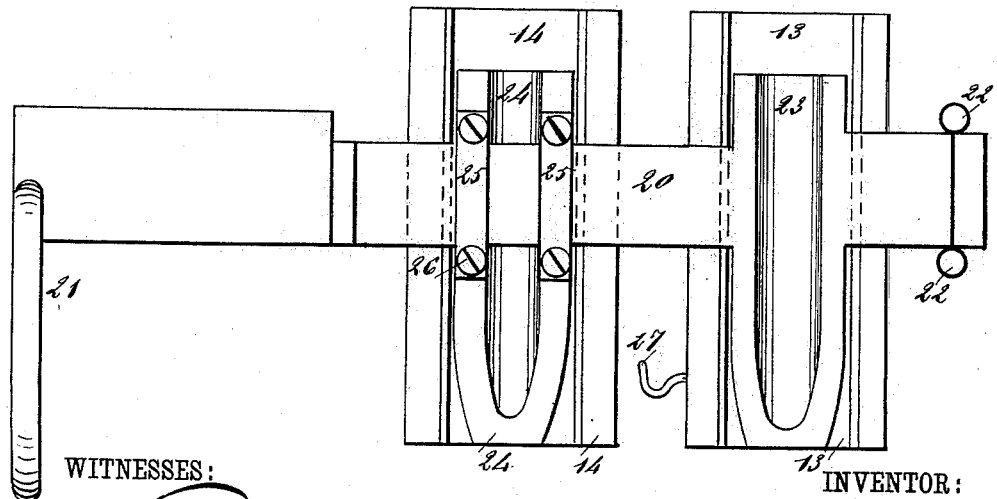
WITNESSES:
C. Neveux
C. Sedgwick
INVENTOR:
P. M. Hobbs
BY Munn & Co.
ATTORNEYS.

UNITED STATES PATENT OFFICE.

PHILIP M. HOBBS, OF WYMORE, NEBRASKA.

COW-MILKER.

SPECIFICATION forming part of Letters Patent No. 370,539, dated September 27, 1887.

Application filed February 1, 1887. Serial No. 226,165. (No model.)

*To all whom it may concern:*

Be it known that I, PHILIP M. HOBBS, of Wymore, in the county of Gage and State of Nebraska, have invented a new and Improved Cow-Milker, of which the following is a full, clear, and exact description.

This invention relates to a novel form of milker, the objects of the invention being to provide a simple and durable apparatus that may be used by women and children for the purpose of milking cows, and one which may be used by the operator where his or her hands are gloved, the device being somewhat in the form of a pair of scissors, and two of the milkers being employed in milking, one device being operated by each hand.

Reference is to be had to the accompanying drawings, forming part of this specification, in which similar letters of reference indicate corresponding parts in all the figures.

Figure 1 is a plan view of my improved form of milker. Fig. 2 is a view of the handle end of the milker. Fig. 3 is a cross-sectional view taken on line $xx$ of Fig. 1, and Fig. 4 is a side view of the milker.

In constructing such a milker as the one illustrated in the drawings above referred to, I provide a main lever, 10, that is formed with a grip-loop, 11, at one end, and an inclined-faced block, 12, at the other, in which block there is a teat-recess, 13. Between the handle or grip-loop 11 and the block 12 the lever 10 is cut away, and in the rabbet so formed I mount an adjustable block, 14, that is held to the lever by vertical strips 15, through which pass set-screws by which the strips are clamped to the block, the lever 10 resting in properly-formed recesses with which the block is provided.

In connection with the lever 10, I arrange a lever, 20, that is also provided with a grip or handle, as shown at 21, and this lever 20 is held to the lever 10 by springs 22. The lever 20 is formed with a projection, 23, which registers with the recess 13 of the block 12, and upon the lever I mount an adjustable curved-faced slide, 24, said slide being recessed to receive the lever 20, and being held thereto by strips 25, that are clamped to the slide and lever by set-screws 26. This slide 24 is arranged to enter a teat-recess, 17, that is formed in the block 14, and all of the parts which come in contact with the teats are covered with soft rubber, as shown at 2. The faces of the projection 23 and the slide 24 flare outward, so that when the apparatus is in use the lever 20 may be rocked to bring the faces of these flaring projections to bear against the teats, first at the top and then downward to the bottom, the necessary reciprocating motion being provided for by forming the block 12 with an inclined face, as shown in Fig. 1— that is to say, the action of the spring 22, which is secured to the upper outer edges of the two levers, as shown in Fig. 1, will tend to separate the lower edges of the levers, and consequently the handles will incline outward from their upper to their lower ends. By this construction, when the handles are first drawn together, the levers will move horizontally toward each other, and then the upper ends of the projections will press the teat, and by continuing the pressure the action of the spring will be overcome and the lower edges of the levers brought together. The levers thus moving in a vertical plane will rock the projections 23 and 24 from their upper to their lower curved ends.

In operation two of the milkers are used at the same time, one being grasped by each hand of the operator, two teats being operated upon by each device. By making the block 14 and the projection or slide 24 adjustable I am able to adapt the milker to the teats of any cow.

In practice I have found it convenient to provide the block 12 with a hook, 27, upon which the milk-pail may be supported.

In certain cases it might be advisable to remove the block 14 and slide 24—as, for instance, when the milker is to be operated by a very young child.

It will be noticed that as the levers are brought together the teats are first compressed at the top, and then gradually compressed toward their points, the milk being forced outward as the teats are so compressed.

Having thus described my invention, I claim as new and desire to secure by Letters Patent—

1. A milker comprising two hand-levers connected at their outer ends and having a horizontal reciprocating movement toward each other, and one of the levers being adapted to be rocked in a vertical plane, one of said levers having a teat-receiving recess and the other a projection to fit therein, said projection being curved outward at its lower end, substantially as set forth.

2. A cow-milker comprising the hand-levers connected by a spring at the upper sides of their outer ends, and constructed to be moved toward each other, one of said levers also having a vertical rocking movement with respect to the other, and provided with a projection curved outward at its lower end, and the other lever having a teat-receiving recess into which the projection enters to press the upper end of the teat first with its upper surface and by rocking its lever gradually transfer the pressure to the curved end of the projection and lower end of the teat, substantially as set forth.

3. In a milker, the combination, with a lever formed with a fixed recessed block, and provided with an adjustable recessed block, of a second lever, springs connecting the two levers, and fixed and adjustable projections carried by the second lever, substantially as described.

4. In a milker, the combination, with a lever formed with a recessed block that has an inclined face, of an adjustable recessed block carried by the lever, a second lever, springs connecting the two levers, fixed and adjustable projections carried by the second lever, and soft-rubber linings for the teat-bearing portions of the milker, substantially as described.

5. In a milker, the combination, with a lever formed with a recessed block, and provided with an adjustable recessed block, of a lever formed with a projection and provided with an adjustable projection, the two projections being formed with flaring faces, springs, by which the levers are united, and soft-rubber linings for the teat-bearing portions of the milker, substantially as described.

PHILIP M. HOBBS.

Witnesses:
J. W. GERMAN,
M. L. McQUINN.